(12) United States Patent
Picotte et al.

(10) Patent No.: US 9,973,333 B1
(45) Date of Patent: May 15, 2018

(54) BUMP-IN-THE-WIRE TIME CODE SIGNAL DECODER AND DEBUGGER

(71) Applicant: COOPER TECHNOLOGIES COMPANY, Houston, TX (US)

(72) Inventors: Alain Picotte, Levis (CA); Ronald Landheer, Quebec (CA); Hugues Bilodeau, Quebec (CA)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days. days.

(21) Appl. No.: 15/340,591

(22) Filed: Nov. 1, 2016

(51) Int. Cl.
*H04L 7/00* (2006.01)
*H04L 7/04* (2006.01)
*G06F 13/42* (2006.01)

(52) U.S. Cl.
CPC .......... *H04L 7/041* (2013.01); *G06F 13/4282* (2013.01)

(58) Field of Classification Search
CPC ....... H04L 7/0008; H04L 7/02; H04L 7/0331; H04L 25/4902; H04B 10/524
USPC .......................... 375/354, 355, 360; 371/375
See application file for complete search history.

(56) References Cited

U.S. PATENT DOCUMENTS

| 2005/0058126 | A1* | 3/2005 | Zettwoch | H04L 43/00 370/375 |
| 2007/0067119 | A1* | 3/2007 | Loewen | G01R 22/065 702/57 |
| 2011/0185214 | A1* | 7/2011 | Luskind | G06F 1/12 713/375 |

* cited by examiner

*Primary Examiner* — Khai Tran
(74) *Attorney, Agent, or Firm* — Eckert Seamans

(57) ABSTRACT

A bump-in-the-wire time code signal decoder and debugger apparatus includes a controller structured and configured to: receive an encoded time code signal, decode the encoded time code signal, and produce a parsed signal based on the decoding of the encoded time code signal. The apparatus also includes a communications interface coupled to the controller, wherein the communications interface is structured to receive the parsed signal and generate an output signal based on the parsed signal.

17 Claims, 4 Drawing Sheets

BUMP-IN-THE-WIRE TIME CODE SIGNAL DECODER AND DEBUGGER

BACKGROUND

Field

The disclosed concept pertains generally to time codes/signals that are used by various electronic devices for data correlation with time, and, more particularly, to a bump-in-the-wire device that is capable of decoding and parsing time codes/signals, such as, without limitation, IRIG time codes, for use by downstream electronic devices and/or for clock debugging purposes.

Background Information

Modern-day electronic systems, such as communication systems, data handling systems, and power distribution systems, require precise time information for data correlation with time. Inter-range instrumentation group time codes, commonly known as IRIG time codes, are standard time code formats that were created by the Telecommunications Working Group of the US military's Inter-Range Instrumentation Group (IRIG).

IRIG time codes are widely used for transferring time information. An IRIG time code is made up of repeating frames of various types of time information. The codes are generated by a clock or "time-of-day" source, such as an atomic frequency standard or a GPS receiver, and are provided to remote terminal devices for time correlation purposes.

The IRIG time code standard defines a number of different time code protocols, each identified by unique alphabetic designation. The main difference between the various codes is their rate, which varies between one pulse per minute and 10,000 pulses per second.

The IRIG-B time code protocol is widely used by electric utilities, industrials, and others to ensure precise time synchronization of power system devices, such as breakers, phase measurement units, relays and meters. An IRIG-B time code signal consists of a frame containing 100 bits of information that is generated every second. In each frame, 74 of the bits contain various time and date information in binary form (logical ones and zeros), with the remainder of bits being used as position identifiers or padding. IRIG-B time code signals thus provide a reliable method of transmitting time to synchronize power equipment devices.

When an IRIG-B time code signal is received by the electronic device, it must be decoded prior to being utilized. IRIG-B decoding, however, can be expensive in terms of CPU power. For example, in a typical application, decoding the IRIG-B signal takes about 30% of the CPU time just due to the interrupts generated by the signal. In addition, many systems use IRIG-B clock sources from different manufacturers. As a result, it is often necessary to debug those clocks and devices that use those clocks. For example, a clock source may configure the IRIG-B signal in a manner that does not match up with what the receiving device is expecting. In such a situation, it may be necessary to change the settings of either the clock source or the receiving device. In order to do so, the IRIG-B signal must be obtained in a format that allows for the analysis to be performed.

SUMMARY

In one embodiment, a time code signal decoder and debugger apparatus is provided. The apparatus includes a controller structured and configured to: (i) receive an encoded time code signal, (ii) decode the encoded time code signal, and (iii) produce a parsed signal based on the decoding of the encoded time code signal. The apparatus also includes a communications interface coupled to the controller, wherein the communications interface is structured to receive the parsed signal and generate an output signal based on the parsed signal.

In another embodiment, a method of processing an encoded time code signal is provided. The method includes receiving the encoded time code signal in an apparatus including a housing that houses a controller and a communications interface coupled to the controller, decoding the encoded time code signal within the apparatus, producing a parsed signal based on the decoding of the encoded time code signal within the apparatus, and generating in and transmitting from the apparatus an output signal based on the parsed signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
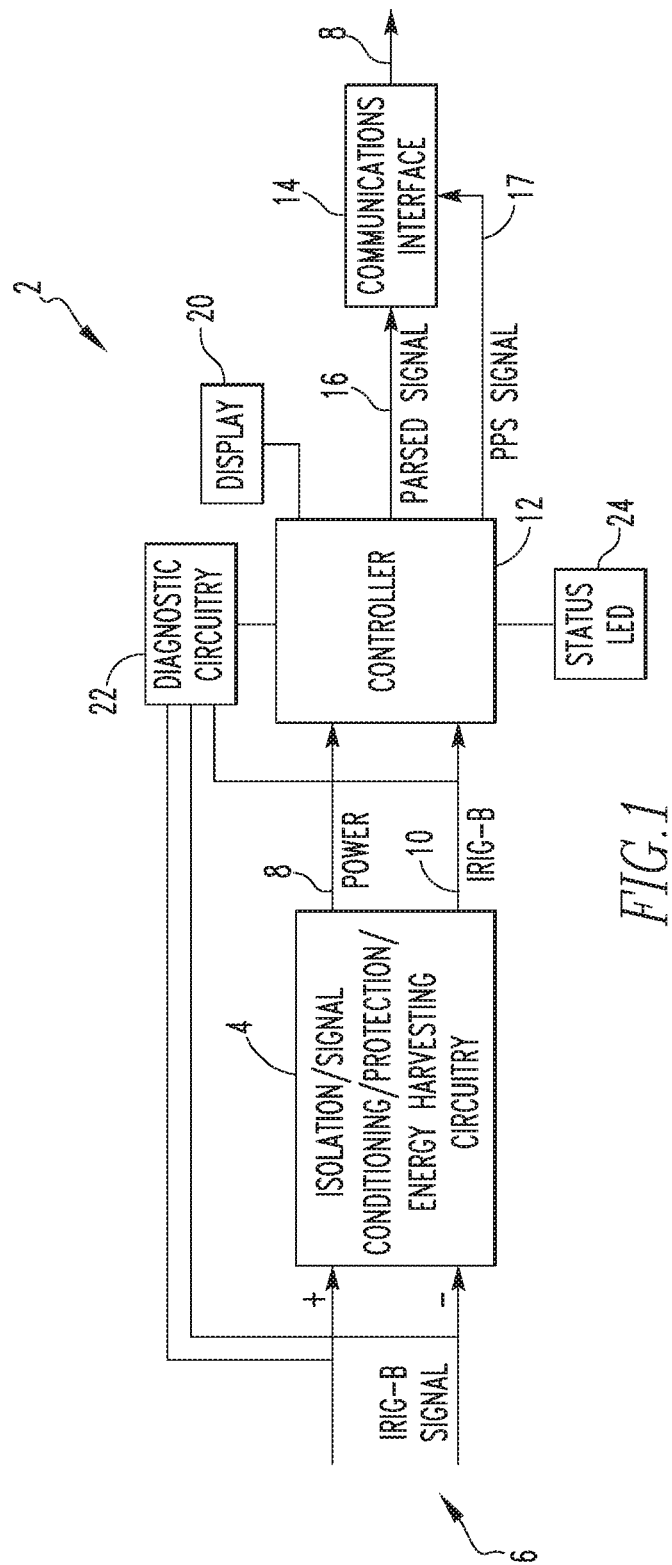
FIG. 1 is a block diagram of a bump-in-the-wire time signal decoder and debugger apparatus according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the term "number" shall mean one or an integer greater than one (i.e., a plurality).

As used herein, the statement that two or more parts are "coupled" together shall mean that the parts are joined together either directly or joined through one or more intermediate parts.

As used herein, the term "controller" means a programmable analog and/or digital device (including an associated memory part or portion) that can store, retrieve, execute and process data (e.g., software routines and/or information used by such routines), including, without limitation, a programmable system on a chip (PSOC), a field programmable gate array (FPGA), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the term "parse" means to convert a decoded binary signal into a predetermined format and/or structure for use by a downstream receiving device, wherein the predetermined format and/or structure is based upon the configuration and/or rules of the downstream receiving device.

FIG. 1 is a block diagram of a bump-in-the-wire time code signal decoder and debugger apparatus 2 according to an exemplary embodiment of the disclosed concept. As described in greater detail herein, decoder and debugger apparatus 2 is structured and configured to receive a time signal, such as, without limitation, an IRIG-B signal, from a clock source such as a GPS receiver, decode and parse that signal, and output the parsed signal in a suitable format for use by a downstream device such as, without limitation, a remote terminal unit of a power distribution system for data synchronization purposes and/or for use by a terminal, such as a PC, laptop, tablet computer, or smart phone, for debugging purposes. For ease of illustration and description, the disclosed concept will be described in connection with the exemplary embodiment using an IRIG-B signal. It will be understood, however, that that is meant to be exemplary only, and that other time code signals, such as, without limitation, other IRIG signals, may also be utilized in connection with the disclosed concept.

Referring to FIG. 1, decoder and debugger apparatus 2 includes circuitry 4 that is structured to receive IRIG-B signal 6 from a clock source such as a GPS receiver. As is known, IRIG-B is a 2-wire protocol, and thus circuitry 4 receives a + and a − IRIG-B signal input. In the exemplary embodiment, circuitry 4 is structured and configured to perform a number of functions, including isolation, signal conditioning, circuit protection, and energy harvesting, each of which is described briefly below.

In connection with the isolation function, circuitry 4 may include, for example, and without limitation, an opto-coupler device that provides the isolation functionality by transferring electrical signals between two isolated circuits using light. In connection with the circuit protection functionality, circuitry 4 may include a number of transient voltage suppressor diodes for providing transient voltage suppression functionality for decoder and debugger apparatus 2. With respect to the energy harvesting functionality, in the exemplary embodiment, circuitry 4 is structured to harvest energy from the received IRIG-B signal 6 and output DC power, which harvested DC power is used to provide power for operation of decoder and debugger apparatus 2. In this manner, in the exemplary embodiment, decoder and debugger apparatus 2 does not require a separate on-board or connected battery or other power supply device. In one particular embodiment, circuitry 4 may include a voltage boosting and rectifying circuit, preferably in the form of one or more stage charge pump, for energy harvesting purposes. Charge pumps are well known in the art. Basically, one stage of a charge pump increases the effective amplitude of an AC input voltage with the resulting increased DC voltage appearing on an output capacitor. Successive stages of a charge pump, if present, will essentially increase the voltage from the previous stage resulting in an increased output voltage. As seen in FIG. 1, circuitry 4 outputs two signals in the form of power signal 8 and conditioned IRIG-B signal 10.

Decoder and debugger apparatus 2 further includes a controller 12. Controller 12 is coupled to circuitry 4 such that is structured and configured to receive power signal 8 and conditioned IRIG-B signal 10. As described in greater detail herein, controller 12 is provided with a number of routines that receive the conditioned IRIG-B signal 10, and decode and parse the conditioned IRIG-B signal 10 and thereby generate a parsed signal 16, which, as described herein, may be in machine readable and/or human readable (i.e., text) form. Parsed signal 16 may then, as described in more detail herein, be output by decoder and debugger apparatus 2 in a suitable format to a downstream device for use thereby for data correlation with time and/or used for debugging purposes.

Controller 12 further outputs a one-pulse-per-second (PPS) signal 17 synchronized to the unconditioned IRIG-B signal 6 by compensating for any delay circuitry 4 may have introduced conditioning the signal. This PPS signal is suitable for a downstream device for use thereby for highly accurate time synchronization purposes.

As seen in FIG. 1, decoder and debugger apparatus 2 also further includes a number of components that are coupled to controller 12. In particular, a communications interface 14 is coupled to controller 12 and is structured to receive parsed signal 16 that is output by controller 12 and, described in more detail below, output that signal in a suitable format. Communications interface 14 may be any of a number of suitable communications interfaces that is capable of receiving parsed signal 16 and generating and outputting output signal 18 in a form that may be used by a downstream device. For example, communications interface 14 may be a serial interface, such as an RS-232 interface, that receives parsed signal 16 in the form of an asynchronous serial signal from controller 12 and converts that asynchronous serial signal to an RS-232 signal that is output on an appropriate connector, such as a DB-9 connector. One of the pins of the DB-9 connector may then also be used to transmit the PPS signal 17 to the downstream device. Alternatively, communications interface 14 may be a USB interface that is structured to receive parsed signal 16 and provide output signal 18 in the form of a USB protocol signal on a USB connector. In an implementation wherein communications interface 14 is a USB interface, communications interface 14 may also be used to provide power to controller 12 as an alternative to the energy harvesting described elsewhere herein. In still another alternative embodiment, communications interface 14 may be a Bluetooth interface that receives parsed signal 16 and generates output signal 18 in the form of a wireless signal according to the Bluetooth protocol. It will be appreciated that the embodiments just described are meant to be exemplary only, and that other suitable communications interfaces may also be employed within the scope of the disclosed concept.

Energy harvesting is also possible on communications interface 14, particularly if there is a desire to diagnose signal tension levels.

As seen in FIG. 1, the exemplary embodiment of decoder and debugger apparatus 2 also includes an onboard display 20, such as a liquid crystal display (LCD). Display 20 may be used to visually display the parsed signal 16 so that it may be used, for example, for debugging purposes. In such an implementation, display 20 may visually display either or both of the machine readable and/or human readable form of parsed signal 16. It will be understood, however, that display 20 is optional and that it therefore may be omitted in certain particular embodiments.

The exemplary embodiment of decoder and debugger apparatus 2 shown in FIG. 1 also includes diagnostic circuitry 22 that is coupled to controller 12. Diagnostic circuitry 22 is structured to measure the signal power level, minimum and maximum amplitude, modulation ratio, signal frequency and/or noise level of IRIG-B signal 6 and/or conditioned IRIG-B signal 10. Information generated by diagnostic circuitry 22 may, in one particular exemplary embodiment, optionally be added to parsed signal 16 when it is generated as described herein. Finally, the exemplary embodiment of decoder and debugger apparatus 2 shown in FIG. 1 further includes a status LED 24 that is coupled to controller 12. As explained below, status LED is structured and configured to provide a real-time indication that decoder and debugger apparatus 2 is functioning.

The operation of decoder and debugger apparatus 2 will now be described in more detail. First, as described elsewhere herein, IRIG-B signal 6 is received by circuitry 4. Upon receipt of IRIG-B signal 6, circuitry 4 conditions that signal and outputs conditioned IRIG-B signal 10. In addition, circuitry 4 will harvest DC energy from the received IRIG-B signal 6 and generate DC power signal 8. As described elsewhere herein, DC power signal 8 is used to provide operating power for decoder and debugger apparatus 2.

Figure 2:
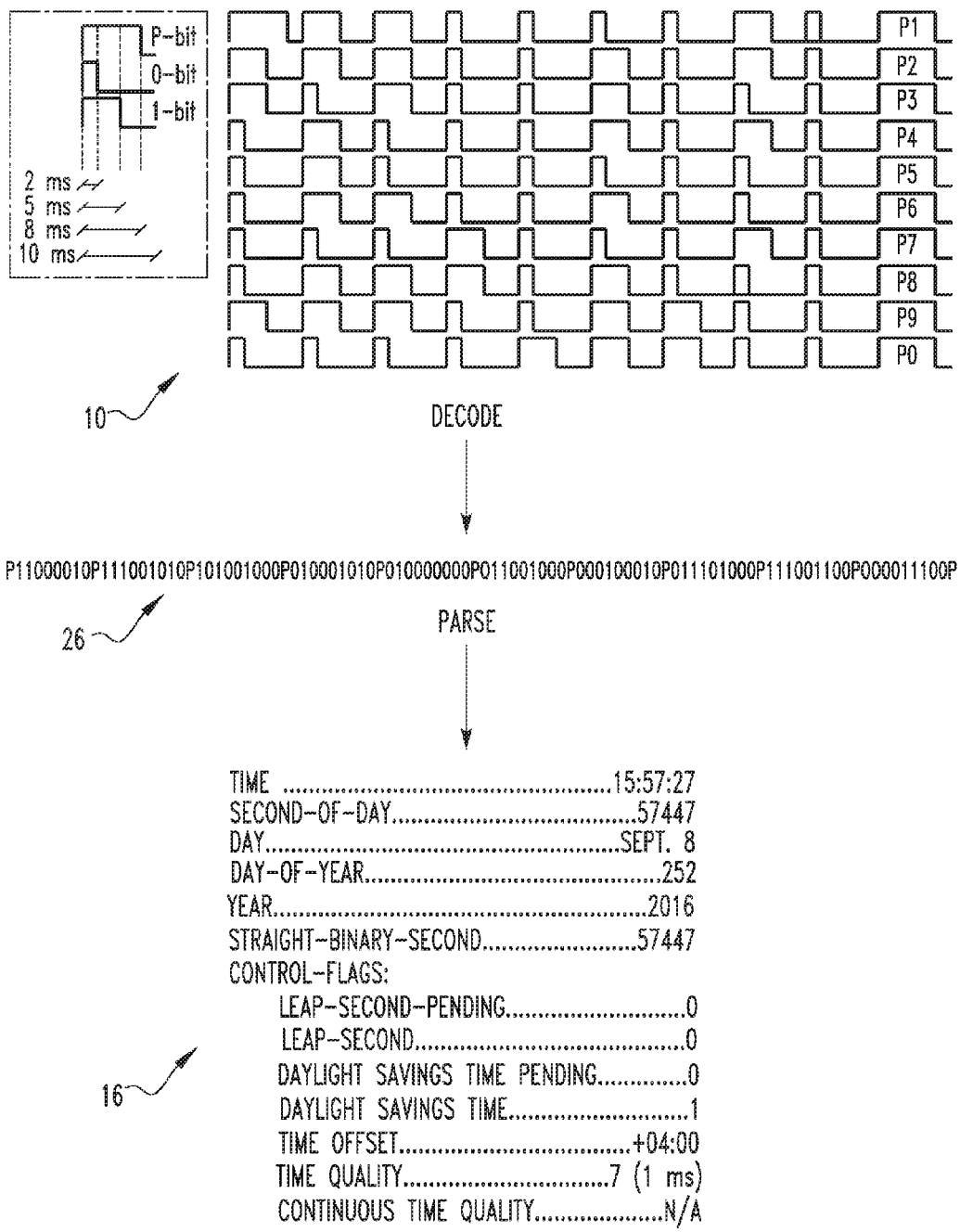
FIG. 2 is a schematic diagram showing the decoding and parsing of an IRIG-B time code signal according to one exemplary embodiment.

Moreover, controller 12, in response to receiving the conditioned IRIG-B signal 10, will decode and parse that signal to produce and output parsed signal 16. This decoding and parsing operation is illustrated in more detail in FIG. 2. As is known in the art, IRIG time code formats use pulse-width coding wherein a binary one pulse has a duration of 50% of the index count interval, a binary zero pulse has a duration of 20% of the index count interval, and position identifiers (used as reference markers in the signal) have a duration of 80% of the index count interval. In addition, IRIG time code signals may be unmodulated (DC level shift, no carrier signal), modulated (amplitude-modulated, sine wave carrier), or modified Manchester modulated (amplitude-modulated, square wave carrier). In the example shown in FIG. 2, conditioned IRIG-B signal 10 is in the form of an unmodulated pulse-with coded signal. It will be understood, however, that this is for exemplary purposes only, and that other formats are contemplated within the scope of the disclosed concept. As noted above, controller 12 is provided with a number of routines that are structured and configured to first decode conditioned IRIG-B signal 10 (e.g., in the form of the unmodulated pulse-with coated signal shown in FIG. 2) to generate binary decoded signal 26 as shown in FIG. 2. Next, controller 12 will parse the binary decoded signal 26 into parsed signal 16. Parsed signal 16 may be a parsed human readable signal as shown in FIG. 2, a parsed machine readable signal (e.g., a parsed binary signal), or both a parsed human readable signal and a parsed machine readable signal. Once so generated, parsed signal 16 is provided to communications interface 14 for generation and transmission of output signal 18, and to display 26 for visual display to a user as described herein.

According to one non-limiting, exemplary embodiment, controller 12 is structured to perform decoding and parsing simultaneously (i.e., in parallel).

In addition, controller 12 is structured and configured to control status LED 24 such that it will be lit each time that a frame of IRIG-B signal 6 is decoded and parsed as just described. Thus, in the exemplary embodiment using IRIG-B signal 6, status LED 24 will be caused to be lit once every second because IRIG-B time codes have a 1 Hz frame rate.

Figure 3:
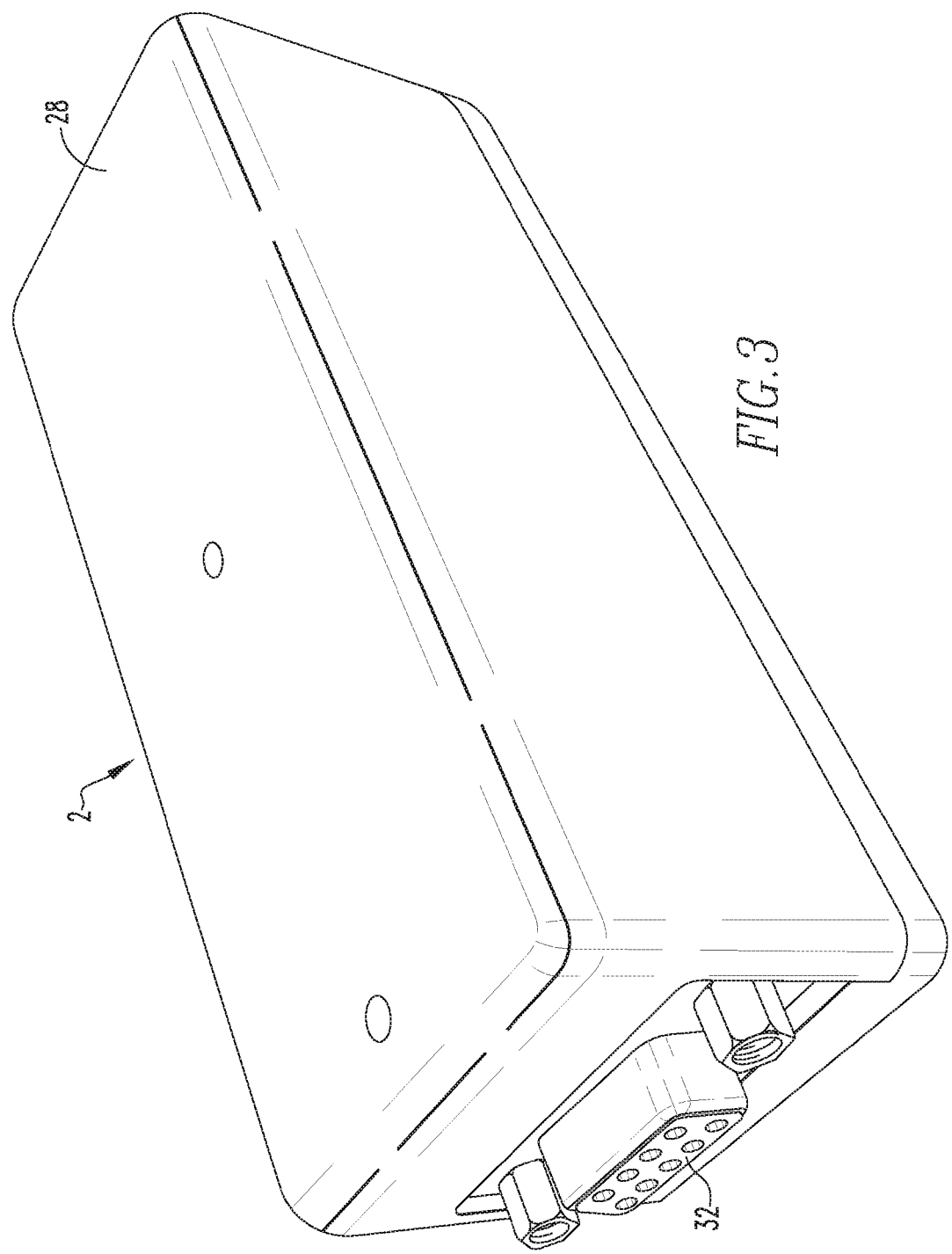
FIGS. 3 and 4 show one particular, non-limiting exemplary embodiment of the decoder and debugger apparatus shown in FIG. 1.
Figure 4:
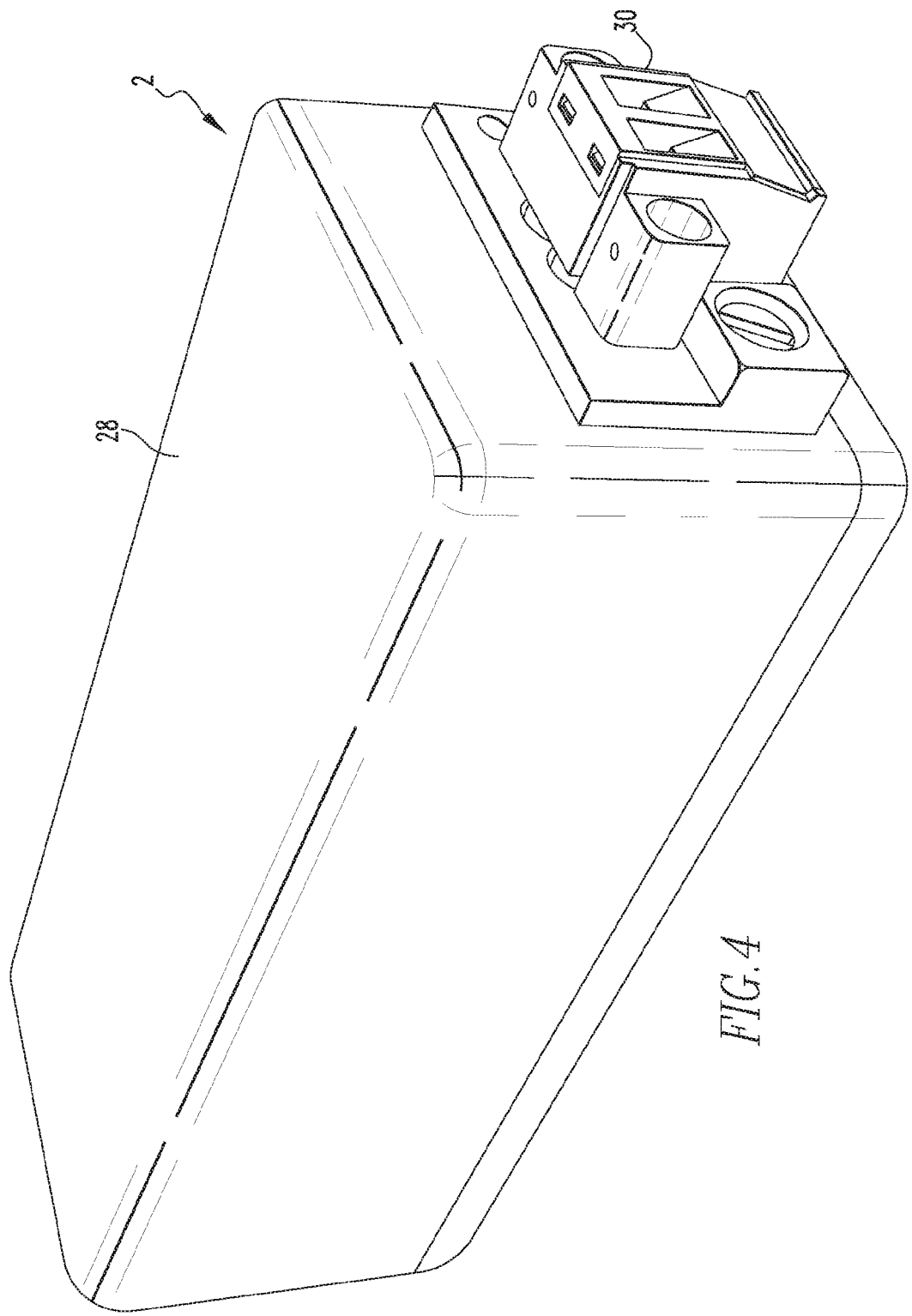

FIGS. 3 and 4 show one particular exemplary embodiment of decoder and debugger apparatus 2. As seen in FIGS. 3 and 4, decoder and debugger apparatus 2 of the illustrated embodiment includes a housing 28 that is structured to house the various components of decoder and debugger apparatus 2. In addition, decoder and debugger apparatus 2 of this embodiment includes a 2 pin connector 30 at a first end thereof for allowing the signal wires that carry IRIG-B signal 6 to be coupled to decoder and debugger apparatus 2. In addition, in this exemplary embodiment, communications interface 14 is in the form of an RS-232 serial interface. Thus, decoder and debugger apparatus 2 includes a DB-9 at a second end thereof.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A time code signal decoder and debugger apparatus, comprising:
   a controller structured and configured to: receive an encoded time code signal, decode the encoded time code signal, and produce a parsed signal based on the decoding of the encoded time code signal;
   a communications interface coupled to the controller, wherein the communications interface is structured to receive the parsed signal and generate an output signal based on the parsed signal; and
   circuitry structured to receive an input encoded time code signal, wherein the circuitry includes: energy harvesting circuitry structured to generate DC power for powering the time code signal decoder and debugger apparatus from the input encoded time code signal, and signal conditioning circuitry structured to generate the encoded time code signal from the input encoded time code signal.

2. The time code signal decoder and debugger apparatus according to claim 1, wherein the encoded time code signal is an Inter-Range Instrumentation Group signal.

3. The time code signal decoder and debugger apparatus according to claim 2, wherein the encoded time code signal is an Inter-Range Instrumentation Group-B signal.

4. The time code signal decoder and debugger apparatus according to claim 1, wherein the parsed signal is a parsed machine-readable signal.

5. The time code signal decoder and debugger apparatus according to claim 1, wherein the parsed signal is a parsed text signal.

6. The time code signal decoder and debugger apparatus according to claim 1, further comprising a display coupled to the controller, the display being structured to receive and visually display the parsed signal, in whole or in part.

7. The time code signal decoder and debugger apparatus according to claim 1, wherein the communications interface comprises one of a serial interface and a wireless interface.

8. The time code signal decoder and debugger apparatus according to claim 7, wherein the serial interface is a USB interface and wherein the time code signal decoder and debugger apparatus receives power through the USB interface.

9. A method of processing an encoded time code signal, comprising:
   receiving the encoded time code signal in an apparatus including a housing that houses a controller and a communications interface coupled to the controller;

decoding the encoded time code signal within the apparatus;

producing a parsed signal based on the decoding of the encoded time code signal within the apparatus;

generating in and transmitting from the apparatus an output signal based on the parsed signal; receiving an input encoded time code signal, generating DC power for powering the apparatus by harvesting energy from the input encoded time code signal, and generating the encoded time code signal from the input encoded time code signal.

10. The time code signal decoder and debugger apparatus according to claim 1, further comprising a status indicator, wherein the encoded time code signal includes a plurality of frames and wherein the status indicator is structured to output a signal each time a frame of the encoded time code signal is decoded and parsed.

11. The method according to claim 9, wherein the encoded time code signal is an Inter-Range Instrumentation Group signal.

12. The method according to claim 11, wherein the encoded time code signal is an Inter-Range Instrumentation Group-B signal.

13. The method according to claim 9, wherein the parsed signal is a parsed machine-readable signal.

14. The method according to claim 9, wherein the parsed signal is a parsed text signal.

15. The method according to claim 9, further visually displaying the parsed signal from the apparatus.

16. The method according to claim 9, further comprising providing power to the apparatus through the communications interface.

17. The method according to claim 9, wherein the encoded time code signal includes a plurality of frames, the method further comprising generating and outputting from the apparatus a status signal each time a frame of the encoded time code signal is decoded and parsed.

* * * * *